US 6,699,961 B2

(12) United States Patent
Eleveld et al.

(10) Patent No.: US 6,699,961 B2
(45) Date of Patent: Mar. 2, 2004

(54) DMC COMPLEX CATALYST AND PROCESS FOR ITS PREPARATION

(75) Inventors: Michiel Barend Eleveld, Amsterdam (NL); Riemer Alberts De Groot, Amsterdam (NL); Ronald Van Kempen, Amsterdam (NL); Johan Paul Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/239,614

(22) PCT Filed: Mar. 27, 2001

(86) PCT No.: PCT/EP01/03498

§ 371 (c)(1),
(2), (4) Date: Sep. 24, 2002

(87) PCT Pub. No.: WO01/72418

PCT Pub. Date: Oct. 4, 2001

(65) Prior Publication Data

US 2003/0069389 A1 Apr. 10, 2003

(30) Foreign Application Priority Data

Mar. 30, 2000 (EP) .............................................. 00201170

(51) Int. Cl.⁷ .......................... C08G 65/04; B01J 27/26; C07C 43/11
(52) U.S. Cl. ....................... 528/414; 568/579; 568/606; 568/613; 568/617; 568/618; 528/403; 528/409; 528/410; 528/412; 502/102; 502/104; 502/175
(58) Field of Search ................................. 568/579, 606, 568/613, 617, 618; 528/403, 409, 410, 412, 414; 502/102, 104, 175

(56) References Cited

U.S. PATENT DOCUMENTS

| 3,427,335 | A | * | 2/1969 | Herold ........................ 549/206 |
| 3,829,505 | A | * | 8/1974 | Herold ........................ 568/606 |
| 4,477,589 | A | * | 10/1984 | van der Hulst et al. .... 502/169 |
| 5,158,922 | A | * | 10/1992 | Hinney et al. .............. 502/175 |
| 6,015,928 | A | | 1/2000 | Gubisch et al. ................ 27/22 |

FOREIGN PATENT DOCUMENTS

| EP | 0 555 053 A1 | 8/1993 |
| EP | 0 654 302 A1 | 5/1995 |
| EP | 0 700 949 A3 | 8/1996 |
| EP | 0 755 716 A1 | 1/1997 |
| WO | 97 40086 | 10/1997 |

* cited by examiner

Primary Examiner—Samuel A. Acquah

(57) ABSTRACT

A process for the preparation of a DMC catalyst useful in the polymerization of alkylene oxides into polyether polyols, which process having the steps of (a combining an aqueous solution of a metal salt with an aqueous solution of a metal salt with an aqueous solution of a metal cyanide salt and reacting these solutions, wherein at least part of this reaction takes place in the presence of an organic complexing agent, thereby forming a dispersion of a solid DMC complex in an aqueous medium; (b) combining the dispersion obtained in step (a) with a liquid, which is essentially insoluble in water and which is capable of extracting the solid DMC complex formed in step (a) from the aqueous medium, and allowing a two-phase system to be formed consisting of a first aqueous layer and a layer containing the DMC complex and the liquid added; (c) removing the first aqueous layer; and (d) recovering the DMC catalyst from the layer containing the DMC catalyst.

16 Claims, No Drawings

DMC COMPLEX CATALYST AND PROCESS FOR ITS PREPARATION

FIELD OF THE INVENTION

The present invention relates to a double metal cyanide complex catalyst and to a process for its preparation.

BACKGROUND OF THE INVENTION

Double metal cyanide DMC) compounds are well known catalysts for epoxide polymerization, i.e. for polymerizing alkylene oxides like propylene oxide and ethylene oxide to yield poly(alkylene oxide) polymers, also referred to as polyether polyols. The catalysts are highly active, and give polyether polyols that have low unsaturation compared with similar polyols made using strong basis catalysts like potassium hydroxide. Conventional DMC catalysts are prepared by reacting aqueous solutions of metal salts and metal cyanide salts to form a precipitate of the DMC compound. Beside for the preparation of polyether polyols the catalysts can be used to make a variety of polymer products, including polyester polyols and polyetherester polyols. The polyols can be used for preparing polyurethanes by reacting them with polyisocyanates under appropriate conditions. Polyurethane products that can be made include polyurethane coatings, elastomers, sealants, foams, and adhesives.

DMC catalysts are usually prepared in the presence of a low molecular weight organic complexing agent, typically an ether, such as dimethoxyethane (glyme), or an alcohol, such as tert-butyl alcohol. The complexing agent favourably impacts the activity of the catalyst for epoxide polymerization. Other known complexing agents include ketones, esters, amides and ureas.

In one conventional preparation, aqueous solutions of zinc chloride and potassium hexacyanocobaltate are combined. The resulting precipitate of zinc hexacyano cobaltate is combined with an organic complexing agent. An excess of metal salt is often used in such preparation. For instance, in EP-A-555053 a process for making easily filterable DMC catalysts is disclosed, wherein the order of reagent addition, the reaction temperature, and the stoichiometric ratio of the reactants are controlled. EP-A-555053 discloses that at least a 100% stoichiometric excess of the metal salt relative to the metal cyanide salt should be used. In the working examples dimethoxyethane is used as the organic complexing agent. Zinc hexacyanocobaltate catalysts prepared by this procedure generally have zinc chloride to zinc hexacyanocobaltate mole ratios of about 0.6 or more.

Similarly, in EP-A-654302 a process for preparing substantially amorphous DMC catalysts is disclosed. These catalysts are preferably made using a water-soluble aliphatic alcohol complexing agent, such as tert-butyl alcohol. Again, an excess amount of metal salt is used to make the catalyst. In this method it is essential that metal salt, metal cyanide salt and complexing agent are intimately mixed, e.g. by high shear stirring or homogenization; conventional mechanical stirring is insufficient. Zinc hexacyanocobaltate catalysts described therein have more than 0.2 moles of metal salt per mole of zinc hexacyanocobaltate present, typically more than 0.5 moles of metal salt per mole of zinc hexacyanocobaltate.

EP-A-755716 discloses two different methods for preparing crystalline DMC complex catalysts. In one method, the catalyst is made by using an excess amount of the metal salt, but the excess is less than a 100% stoichiometric excess relative to the amount of metal cyanide salt. The resulting catalyst contains less than about 0.2 moles of the metal salt per mole of DMC compound in the catalyst. In a second method, a larger excess of the metal salt can be used, but the resulting catalyst is subsequently washed with a mixture of water and an organic complexing agent in a manner effective to produce a DMC catalyst that contains less than about 0.2 moles of the metal salt per mole of DMC compound in the catalyst.

In WO-A-97/40086 a method for preparing DMC complex catalysts is disclosed, wherein aqueous solutions of excess metal salt and metal cyanide salt are reacted in the presence of an organic complexing agent using efficient mixing to form a slurry, combining the slurry with a polyether having a molecular weight less than 500 isolating the catalyst, washing the catalyst with an aqueous solution containing additional organic complexing agent and finally recovering the solid DMC complex catalyst. The polyether used suitably is a polyether polyol, such as polyethylene glycol. The final solid DMC catalyst contains 5 to 80% by weight of polyether polyol In EP-A-700949 a similar method as in WO-A-97/40086 is disclosed, the difference being that a polyether (polyol) having a molecular weight greater than 500 is used.

In the methods discussed the initial DMC complex is formed in an aqueous reaction medium. The metal salts used and the salt formed during the complex formation reaction are well soluble in water and hence will be present in the aqueous phase. Since these salts are generally detrimental to the activity of the DMC complex catalyst, they need to be removed before the DMC catalyst is actually used for catalysing any alkoxylation reaction. For instance, assuming that zinc chloride is used as the metal salt and potassium hexacyanocobaltate as the metal cyanide salt, the unreacted zinc chloride and the potassium chloride formed in the reaction between zinc chloride and potassium hexacyanocobaltate would pose a problem, as they are detrimental to the activity of the final DMC catalyst. Hence, these salts must be removed as quantitatively as possible, which is generally done by separating the DMC catalyst particles from the aqueous phase.

All methods discussed so far have in common that the separation of the DMC complex catalyst particles from the salts-containing aqueous phase is rather cumbersome. For instance, in the working examples of WO-A-97/40086 the separation of DMC complex catalyst from the aqueous phase involves centrifugation and decantation, techniques which are not very practicable when to be used on an industrial scale. The separation used in the examples of EP-A-555053 involved filtration using a horizontal basket centrifugal filter and a light weight nylon fabric filter medium. Separation of the formed DMC catalyst particles in the working examples of EP-A-654302 involves either centrifugation or filtration, while in the examples of EP-A-755716 filtration is used. It will be understood that filtration is also not optimal for use on an industrial scale, inter alia because of filter plugging problems that are likely to occur. Moreover, the separation techniques used in the prior art processes discussed above are likely to result in some water and hence some salts remaining in the product. This is undesired.

SUMMARY OF THE INVENTION

The present invention aims to provide a method for preparing a DMC complex catalyst, in which the separation from the aqueous phase of the DMC catalyst particles formed can be performed efficiently, smoothly and cleanly on an industrial scale without losing any catalytic activity. Accordingly, the method should result in a highly active DMC catalyst, or in other words, the method of the present invention should have no negative effect of the activity of the DMC catalyst.

These and other objects have been achieved by a method wherein a specific liquid is added after the formation of the DMC catalyst particles, which liquid effect a phase separation resulting in an aqueous (bottom) phase containing the salts and a catalyst-containing phase floating on the aqueous phase.

DETAILED DESCRIPTION OF THE INVENTION

Accordingly, the present invention relates to a process for the preparation of a DMC catalyst, which process comprises the steps of (a) combining an aqueous solution of a metal salt with an aqueous solution of a metal cyanide salt and reacting these solutions, wherein at least part of this reaction takes place in the presence of an organic complexing agent, thereby forming a dispersion of a solid DMC complex in an aqueous medium;

(b) combining the dispersion obtained in step (a) with a liquid, which is essentially insoluble in water and which is capable of extracting the solid DMC complex formed in step (a) from the aqueous medium, and allowing a two-phase system to be formed consisting of a first aqueous layer and a layer containing the DMC complex and the liquid added;

(c) removing the first aqueous layer; and (d) recovering the DMC catalyst from the layer containing the DMC catalyst.

In step (a) an aqueous solution of a metal salt is combined with an aqueous solution of a metal cyanide salt and these solutions are reacted, wherein at least part of this reaction takes place in the presence of an organic complexing agent. The product obtained after step (a) is a dispersion of a solid DMC complex in an aqueous medium. In general, the expression "aqueous medium" as used in this connection refers to water and any additional substance (e.g. complexing agent) dissolved therein.

Step (a) can suitably be performed by mixing the metal salt solution with the aqueous solution of metal cyanide salt, while simultaneously adding organic complexing agent either as a separate stream (e.g. as such or in admixture with water) or in admixture with on or both of the aqueous reactant streams, e.g. dissolved in the aqueous metal salt solution. In this mode of operation the complete reaction between metal salt and metal cyanide salt takes place in the presence of organic complexing agent. Alternatively, the addition of organic complexing agent is only started immediately after both aqueous reactant streams have been combined. The organic complexing agent may suitably be added as such or in admixture with water. In this mode of operation the complexing agent will be present during only part of the reaction between said reactant streams. Namely, as soon as metal salt and metal cyanide salt are contacted the formation of the DMC complex starts. This can be seen from the instant formation of a precipitate upon starting the addition of one reactant stream to the other. Thus, when the addition of organic complexing agent only starts immediately after the full amounts of metal salt solution and metal cyanide salt solution have been combined, part of the DMC complex formation has already taken place. For the purpose of the present invention it was found very useful when the complexing agent is added immediately after combining the metal salt solution with the metal cyanide salt solution.

Suitable metal salts and metal cyanide salts are, for instance, described in EP-A-755716, the description of which is herein incorporated by reference. Thus, suitable metal salts are water-soluble salts suitably having the formula $M(X)_n$, in which M is selected from the Group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the Group consisting of Zn(II), Fe(II), Co(II), and Ni(II). In the formula, X is preferably an anion selected from the Group consisting of halide, hydroxide, sulfate, carbonate, cyanide, oxalate, thiocyanate, isocyanate, isothiocyanate, carboxylate, and nitrate. The value of n satisfies the valency state of M and typically is from about 1 to about 3. Examples of suitable metal salts include, but are not limited to, zinc chloride, zinc bromide, zinc acetate, zinc acetonylacetate, zinc benzoate, zinc nitrate, iron (II) chloride, iron (II) sulfate, iron (II) bromide, cobalt III) chloride, cobalt (II) thiocyanate, nickel (II) formate, nickel (II) nitrate, and the like, and mixtures thereof. Zinc halides, and particularly zinc chloride, are preferred.

The metal cyanide salt is a water-soluble metal cyanide salt preferably having the general formula $(Y)_a M'(CN)_b(A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion, such as lithium, sodium, potassium and calcium. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; c can be 0 or an integer; the sum of the charges of a, b, and c balances the charge of M'. Suitable water-soluble metal cyanide salts include, for instance, potassium hexacyano-cobaltate(III), potassium hexacyanoferrate(II), potassium hexacyanoferrate(III), calcium hexacyanocobaltate(III) and lithium hexacyano-iridate (III).

The organic complexing agent used should generally be reasonably to well soluble in water. Suitable complexing agents are, for instance, disclosed in EP-A-555053, the descriptions thereof is herein incorporated by reference in its entirety, and in general are water-soluble heteroatom-containing organic compounds that can complex with the double metal cyanide compound. Thus, suitable complexing agents include alcohols, aldehydes, ketones, ethers, esters, amides, ureas, nitrites, sulfides, and mixtures thereof. Preferred complexing agents are ethers like dimethoxy-ethane and diglyme and water-soluble aliphatic alcohols, such as ethanol, isopropyl alcohol, n-butyl alcohol (1-butanol), isobutyl alcohol (2-methyl-1-propanol), sec-butyl alcohol (2-butanol), and tert-butyl alcohol (2-methyl-2-propanol). Of these, dimethoxyethane and tert-butyl alcohol are most preferred.

Combining both aqueous reactant streams may be conducted by conventional mixing techniques including mechanical stirring and ultrasonic mixing. Although applicable, it is not required that intimate mixing techniques like high shear stirring or homogenization are used. The reaction between metal salt and metal cyanide salt may be carried out at a pressure of from about 0.5 to about 10 bar and a temperature of from about 0 to about 80° C. However, it is preferred that the reaction be carried out at mild conditions, i.e. a pressure of about 0.5 to about 2 bar and a temperature of from about 10 to about 40° C.

After the reaction has taken place and a DMC compound has been formed the extracting liquid is added to the reaction product of step (a). Typically the extracting liquid is added under stirring and stirring is continued until the liquid has been uniformly distributed through the reaction mixture. Stirring time is not critical and may suitably take from about 10 seconds up to about 2 hours. It is considered beneficial from a process economic view to keep the stirring time as short as possible and therefore, stirring time will typically be from about 30 seconds to about 30 minutes.

After the stirring has stopped the reaction mixture is allowed sufficient time to settle, i.e. sufficient time to separate into two phases: an aqueous bottom layer and a layer floating thereon containing the DMC catalyst dispersed in the extracting liquid.

The amount of the extracting liquid added should be sufficient to effect phase separation. Accordingly, normally at least about 1% by weight, preferably at least about 2% by weight and more preferably at least about 3% by weight based on total weight of the reaction product of step (a) of extracting liquid are added. Any amount of extracting liquid above the minimum amount required to effect phase separation can be used. The maximum amount will usually be determined by hardware constraints like volume of the reactor. Typically, however, the amount of extracting solvent added will not exceed about 50% by weight, suitably about 30% by weight and more suitably about 20% by weight based on total weight of the reaction product of step (a). The addition is suitably carried out at a temperature of from about 0 to about 80° C., suitably about 10 to about 50° C. The pressure may the same as during the reaction in step (a).

Suitable extracting liquids used in step (b) should in fact meet two requirements: firstly it should be essentially insoluble in water and secondly it must be capable of extracting the DMC complex from the aqueous phase. The latter requirement implies that the organic complexing agent used must have a preference for interacting with this extracting liquid over the aqueous phase containing the dissolved salts. Namely, it is believed that the complexing agent interacts with the extracting liquid and in fact drags along the DMC complete from the aqueous phase into the phase formed by the extracting liquid. The extracting liquid can, for instance, be an ester, a ketone, an ether, a diester, an alcohol, a di-alcohol, a (di)alkyl carbamate, a nitrile or an alkane.

Preferably, the extracting liquid used comprises a compound of the general formula (I):

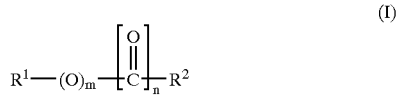

(I)

wherein:
$R^1$ represents hydrogen, an aryl group, a substituted or unsubstituted C1–C10 alkyl group or a group $R^3$—NH—,
$R^2$ represents hydrogen, an optionally halogenated C1–C10 alkyl group, a group $R^3$—NH—, a group —$R^4$—C(O)O—$R^5$ or a cyanide group,
$R^3$ represents hydrogen or a C1–C10 alkyl group,
$R^4$ represents a substituted or unsubstituted alkylene group having 2 to 15 carbon atoms,
$R^5$ represents hydrogen, a substituted or unsubstituted C1–C10 alkyl group, and
n and m independently are 0 or 1.

In a first preferred embodiment in the general formula (I) $R^1$ represents hydrogen, m=1, n=0 and $R^2$ represents a group —$R^4$—OH with $R^4$ representing an alkylene group having 3 to 10 carbon atoms. A specific example of this preferred compound includes 2-butyl-2-ethyl-1,3-propanediol.

In a second preferred embodiment of the present invention in the general formula (I) $R^1$ and $R^2$ independently represent an alkyl group having 1 to 5 carbon atoms, m=1 and n=0. Preferred examples of this embodiment are diethyl ether, methyl tert-butyl ether, di-isopropyl ether and dibutyl ether. Of these methyl tert-butyl ether is particularly preferred.

In a third preferred embodiment in the general formula (I) $R^1$ represents an alkyl group having 1 to 6 carbon atoms, m=1, n=1 and $R^2$ represents hydrogen or an alkyl group having 1 to 6 carbon atoms or a group —$R^4$—C(O)O—$R^5$ with $R^4$ being a substituted or unsubstituted alkylene group having 3 to 15 carbon atoms and $R^5$ being an alkyl group having 1 to 5 carbon atoms. The group $R^4$ may contain alicyclic, aliphatic (alkyl) or polar substituents, like C1–C4 alkoxy groups. Suitably R is a 1,3-propylene group with one or two substituents on the middle carbon atom. Preferred examples of this embodiment are ethyl formiate, ethyl acetate, ethyl-2-ethyl-3-methyl butanoate, di-ethyl malonate and di-ethyl 2-cyclohexyl-2-propyl malonate.

In a fourth preferred embodiment in the general formula. (I) $R^1$ and $R^2$ independently represent an alkyl group having 1 to 5 carbon atoms, m=0 and n=0. Thus, in this embodiment the compound added in step (b) is an alkane having from 2 to 10 carbon atoms. Heptane was found to be particularly useful for the purpose of the present invention.

In a fifth preferred embodiment in the general formula (I) $R^1$ represents an aryl group, suitably a phenyl group, or an alkyl group having 1 to 5 carbon atoms, $R^2$ represents a cyanide group, m=0 and n=0. Preferred examples of this embodiment are benzonitrile and pivalonitrile (tert-butylnitrile).

In a sixth preferred embodiment $R^1$ and $R^2$ independently represent a group $R^3$—NH— with $R^3$ being hydrogen or a C1–C10 alkyl group, m=0 and n=1. Preferred examples of this embodiment are butyl carbamate, dibutyl carbate and propyl carbamate.

In a seventh preferred embodiment $R^1$ represents hydrogen, $R^2$ represents a halogen-substituted C1–C5 alky group, m=0 and n=0. Preferred examples of this embodiment are dichloromethane, 1,2-dichloroethane and tetrachloroethane.

In step (c) of the process of the present invention the aqueous layer formed is removed. Since the aqueous layer forms the bottom layer of the two phase system formed, this could e.g. be easily accomplished by draining the aqueous layer via a valve in the bottom part of the vessel in which the phase separation occurred. In addition to water the aqueous layer will typically contain the excess complexing agent used (i.e. that amount of complexing agent which is not attached to the DMC complex), the water-soluble salts like the unreacted metal salt (e.g. zinc chloride) and any water-soluble salt formed during the reaction between metal salt and metal cyanide salt (e.g. potassium chloride and cobalt salts) and possibly a small amount of the extracting compound left in the aqueous phase. Normally the aqueous layer removed will constitute from 10 to 90 volume % of the total volume of liquid plus catalyst particles present in the vessel, but the volume ratio of aqueous layer to extracting compound layer is not critical for the workability of the present invention. The exact ratio will normally be determined by hardware constraints. After removal of the aqueous phase the remaining phase contains the solid DMC catalyst particles, which are dispersed or finely divided in the extracting compound and which are subsequently recovered in step (d).

The recovery step (d) may be carried out in various ways. As is also described in the patent specifications discussed herein before, such recovery procedure will normally involve mixing the DMC catalyst with complexing agent, optionally in admixture with water, and separating DMC catalyst and complexing agent/water again, e.g. by filtration, centrifugation/decantation or flashing. This procedure may be repeated one or more times. Eventually, the catalyst is dried and recovered as a solid. As disclosed in WO-A-97/40086 and EP-A-700949, the descriptions thereof is herein incorporated by reference in its entirety, the final solid catalyst can also be recovered as a composition also containing from about 5 to about 80% by weight of polyether having a molecular weight of respectively less than 500 and greater than 500. Step (d) of the present process suitably comprises adding a water/complexing agent to the DMC catalyst layer and admixing catalyst layer and water/complexing agent (e.g. by stirring), allowing a two-phase system to be formed and removing the aqueous layer. This procedure may be repeated one to five times after which the remaining catalyst layer may be dried and the catalyst may be recovered in solid form (as a powder) or, alternatively, a liquid polyether polyol may be added to the catalyst layer and a catalyst suspension in polyether polyol is formed, which can be used as such.

In one embodiment a preferred recovery step (d) comprises the steps of (d1) admixing organic complexing agent, water and optionally additional extracting liquid with the layer containing the DMC catalyst and allowing a two phase system to be formed consisting of a second aqueous layer and a layer containing the DMC catalyst;

(d2) removing the second aqueous layer;

(d3) optionally repeating steps (d1) and (d2) one to five times, suitably one or two times;

(d4) adding organic complexing agent to layer containing the DMC catalyst while stirring; and (d5) removing the complexing agent (e.g. by flashing or stripping) and recovering the DMC catalyst as solid particles.

In another embodiment the recovery step (d) comprises steps (d1) to (d4) as defined above followed by:

(d5) adding a liquid polyol to the product of step (d4), thereby forming a slurry of DMC catalyst in a liquid medium of polyol/organic complexing agent;

(d6) removing the organic complexing agent; and (d7) recovering the DMC catalyst as a suspension in the liquid polyol.

The amount of water used in step (d1) should be sufficient to form an aqueous layer. The organic complexing agent and water and optionally additional extracting liquid may be added as separate streams or as a mixture in a single stream. Additional extracting liquid may be added to compensate for any small amount left in the aqueous phase. If added, it will be in small amounts. The weight ratio of complexing agent to water suitably ranges from about 5:95 to about 50:50, more suitably from about 10:90 to about 40:60. The total amount of water and complexing agent added is not critical and could, for instance, correspond with up to about 20 volume % more or less than the amount of aqueous layer drained in step (c). Water and complexing agent are effectively admixed with the DMC catalyst layer, for instance by mechanical stirring. After effective mixing has taken place the resulting mixture is allowed to settle, so that a two phase system can be formed. Once this has happened the aqueous (bottom) layer is removed in step (d2). This can take place in the same way as described supra for step (c). The procedure may be repeated one to five times, suitably one or two times.

In step (d4) pure organic complexing agent is added to the DMC catalyst layer while stirring in an amount which corresponds with the amount of aqueous layer drained in the preceding step, although 20 volume % more or less would still be acceptable.

In subsequent step (d5) the complexing agent may be removed by stripping or flashing, thus recovering the DMC catalyst as a solid. The complexing agent may, for instance, be flashed off at atmospheric conditions or under reduced pressure. Flashing under reduced pressure is preferred, because this enables separation at a lower temperature which reduces the risk of thermal decomposition of the DMC catalyst. In a particularly preferred embodiment the organic complexing agent is removed by flashing under vacuum at a temperature of about 50 to about 80° C. Together with the complexing agent traces of water and extracting liquid, which were still present in the mixture are also removed. The DMC catalyst is recovered as a solid and may be subjected to a subsequent drying treatment.

Alternatively, step (d5) comprises adding a polyol in an amount sufficient to form a catalyst slurry of DMC catalyst in a liquid medium of polyol and complexing agent. Suitably, the amount of polyol is such that the solids content of slurry formed is from about 1 to about 50% by weight, more suitably from about 1 to about 30% by weight and most suitably from about 1 to about 10% by weight.

The polyol added may be any liquid polyol which is suitable to serve as a liquid medium for the DMC catalyst particles. Given the application of the DMC catalyst—catalysing the polymerisation of alkylene oxides into polyether polyols—it is preferred to use a polyol which is compatible with the polyether polyols to be produced and which will not have any negative effect on the final polyether polyol produced when being present therein in trace amounts. Therefore, it is particularly preferred to use a polyether polyol similar to the polyether polyol to be produced by the DMC catalyst. Examples of suitable polyols thus include polyols such as polyethylene glycol, but preferred polyols are the poly(alkylene oxide) polyols based on propylene oxide and/or ethylene oxide similar to those envisaged for preparation using the DMC catalyst.

In the subsequent step (d6) the organic complexing agent is removed from the catalyst slurry. This can be achieved by any means known in the art to be suitable for liquid-liquid separation. A preferred method for the purpose of the present invention is flashing off the complexing agent at atmospheric conditions or under reduced pressure. Flashing under reduced pressure is preferred, because this enables separation at a lower temperature which reduces the risk of thermal decomposition of the DMC catalyst. In a particularly preferred embodiment the organic complexing agent is removed by flashing under vacuum at a temperature of about 50 to about 80° C. Together with the complexing agent traces of water and extracting liquid, which were still present in the mixture are also removed.

Finally, in step (d7) the DMC catalyst is recovered as a slurry in polyol. The advantage of such a slurry is that it is storage stable and can, for instance, be stored in a drum. Moreover, dosing of the catalyst and its distribution through the polymerization medium is greatly facilitated by using a catalyst slurry.

In a further aspect the present invention also relates to a catalyst obtainable by the process as described herein before.

In a final aspect the present invention also relates to a process for the polymerization of an alkylene oxide, which process comprises polymerising an alkylene oxide in the presence of the DMC catalyst and a hydroxyl group-containing initiator. Preferred alkylene oxides are ethylene oxide, propylene oxide, butene oxides, styrene oxide, and the like, and mixtures thereof. The process can be used to make homopolymers, random copolymers or block copolymers.

The DMC catalysts of the invention are very active and hence exhibit high polymerization rates. They are sufficiently active to allow their use at very low concentrations, such as about 25 ppm or less. At such low concentrations, the catalyst can often be left in the polyether polyol without an adverse effect on product quality. The ability to leave catalysts in the polyol is an important advantage because commercial polyols currently require a catalyst removal step.

Polyether polyols prepared using the DMC catalyst prepared in accordance with the present invention have a very low unsaturation, namely consistently less than about 0.007 meq/g and even less than about 0.005 meq/g. Such low unsaturation offers advantages for polyurethanes made with the polyols of the invention.

Polyether polyols made with the catalysts of the invention suitably have a nominal average functionality of from about 2 to about 8, more suitably from about 2 to about 6. The polyols may have a number average molecular weight up to about 50,000, but typically the molecular weight is within the range of about 500 to about 12,000, more typically from about 2,000 to about 8,000.

The invention will be further illustrated by the following examples, however, without limiting the invention to these specific embodiments.

EXAMPLE 1

Preparation of DMC Catalyst

Procedure A: An aqueous zinc chloride solution (30 grams in 100 ml water) was added to a one liter glass reactor equipped with a mechanical stirrer. An aqueous solution of potassium hexacyanocobaltate (12 grams in 225 ml water) was added under stirring in 30 minutes. Immediately after all potassium hexacyanocobaltate was added a mixture of water (95 grams) and tert-butyl alcohol (117 grams) was added under stirring. Stirring was continued for another 30 minutes and the mixture was allowed to stand overnight resulting in a viscous, white coloured, stable dispersion of DMC complex particles in a water/tert-butyl alcohol phase.

Procedure B: To the dispersion obtained after Procedure A was added methyl tert-butyl ether (70 grams) under stirring. Stirring was continued for another 5 minutes. After the stirring had stopped two distinct layers were formed: a highly viscous, white coloured upper layer and a transparent, water-thin, bottom layer. After draining the bottom layer (337 grams), 337 grams of a 25/75 m/m tert-butyl alcohol/water was added under stirring. After stirring for an additional 5 minutes followed by settling during 30 minutes the transparent bottom layer was drained again. This layer had a mass of 355 grams. Subsequently, 355 grams of a 25/75 m/m mixture of tert-butyl alcohol and water was added together with 15 grams of methyl tert-butyl ether under stirring. After stirring for an additional 5 minutes followed by settling during 30 minutes the transparent bottom layer was drained again. The drained layer had a mass of 308 grams. Then, 308 grams of tert-butyl alcohol was added under stirring followed by 240 grams of a propylene oxide adduct of glycerol having a number average molecular weight of 670 Dalton (G670). After stirring for a further 30 minutes the tert-butyl alcohol and residual water were removed by stripping under reduced pressure (300 mbar) a 60° C. until the water content of the DMC/G670 mixture was less than 0.5 wt %.

The product was a highly viscous, stable, white coloured dispersion containing 5 wt % DMC catalyst particles dispersed in G670.

EXAMPLE 2

Polyol Preparation

A one liter mechanically stirred reactor was charged with 89 grams of G670 and 160 milligrams of the DMC catalyst dispersion prepared in Example 1 (corresponding with 20 ppm DMC catalyst based on endproduct). Traces of water were removed by heating the resulting mixture to 130° C. at 5 mbar. The pressure was subsequently released to 50 mbar with nitrogen, after which propylene oxide was added until the pressure was 1.1 bara (corresponding wit) 6 grams of propylene oxide). Then the remaining 305 grams of propylene oxide were added while the pressure was kept at 1.1 bara. After all the propylene had been added, the reaction mixture was held at 130° C. until the pressure reached a constant value.

The reactivity is defined as the time required to propoxylate G670 to a polyol with a molecular weight of 3000 (G3000) at 130° C. and at a propylene oxide pressure of 1.1 bara with 20 ppm catalyst (based on end product).

The reactivity in this example was 91 minutes.

COMPARATIVE EXAMPLE 1

Example 1 was repeated except that the viscous, white coloured, stable dispersion of DMC complex particles in a water/tert-butyl alcohol phase obtained after Procedure A were not subjected to the extraction treatment (Procedure B) as described in Example 1, but instead were subjected to a centrifugation treatment (500 rpm, 4800 G) for 1.5 hour, followed by decantation. The catalyst cake obtained was subsequently reslurried in tert-butyl alcohol/water (70/30 w/w) mixture and centrifuged and decanted again. The settled material was re-slurried in pure tert-butyl alcohol, centrifuged and decanted. Finally, the obtained material was re-slurried in 19 times its amount of G670. After stirring for a further 30 minutes, the tert-butyl alcohol and residual water were removed by stripping under reduced pressure (300 mbar) at 60° C. until the water content of the DMC/ G670 mixture was less than 0.5 wt %.

The product was a highly viscous, stable, white coloured dispersion containing 5 wt % DMC catalyst particles dispersed in G670.

The method used in this comparative example is rather cumbersome and particularly the decantation and filtration are not suitable for application on a commercial scale.

COMPARATIVE EXAMPLE 2

Example 2 was repeated, but this time using the DMC catalyst dispersion of Comparative Example 1.

The reactivity was 109 minutes.

When comparing Example 2 with Comparative Example 2, it can be seen that the DMC catalyst preparation of the invention as exemplified in Example 1 results in a DMC catalyst which is even better than the DMC catalyst prepared to a conventional method as exemplified in Comparative Example 1. Accordingly, the method of the invention involving steps which can be applied on an industrial scale (contrary to the decantation and filtration treatments illustrated in Comparative Example 1) results in an excellent catalyst.

EXAMPLE 3

Extracting Liquids

In each of the experiments listed below a certain amount of extracting liquid was added to the aqueous dispersion obtained in Example 1, Procedure A, at room temperature. The amount of extracting solvent added was 5, 10, 15 or 20% by weight based on the weight of aqueou dispersion to which it was added.

It was investigated at what amount phase separation occurred with the DMC complex being extracted from the aqueous phase into the extracting liquid phase. The room at which the occurrence of phase separation at room temperature was observed is indicated in Table I. I: case phase separation occurred at a deviating temperature this is explicitly mentioned.

From Table I it can be seen that several different compounds are suitable extracting liquids for use in the DMC catalyst preparation method of the present invention

TABLE I

| | Extracting liquids | |
|---|---|---|
| Exp. | Extracting liquid | Phase separation |
| 1 | dichloromethane | 10% (5% at 40° C.) |
| 2 | 2-butyl-2-ethyl-1,3-propanediol | 5% |
| 3 | diethylether | 10% |
| 4 | methyl tert-butyl ether | 10% (5% at 40° C.) |
| 5 | tert-amyl methyl ether | 5% |
| 6 | di-isopropylether | 5% |
| 7 | heptane | 10% (5% at 40° C.) |
| 8 | benzonitril | 5% |
| 9 | pivalonitril | 5% |
| 10 | ethyl formiate | 20% |
| 11 | ethyl acetate | 15% |
| 12 | ethyl 2-ethyl-3-methylbutanoate | 5% |
| 13 | butyl carbamate | 10% |

What is claimed is:

1. A process for the preparation of a DMC catalyst, which process comprises the steps of
    (a) combining an aqueous solution of a metal salt with an aqueous solution of a metal cyanide salt and reacting these solutions, wherein at least part of this reaction takes place in the presence of an organic complexing agent, thereby forming a dispersion of a solid DMC complex in an aqueous medium;
    (b) combining the dispersion obtained in step (a) with a liquid, which is essentially insoluble in water and which is capable of extracting the solid DMC complex formed in step (a) from the aqueous medium, and allowing a two-phase system to be formed consisting of a first aqueous layer and a layer containing the DMC complex and the liquid added;
    (c) removing the first aqueous layer; and
    (d) recovering the DMC catalyst from the layer containing the DMC catalyst.

2. The process as claimed in claim 1, wherein the organic complexing agent is tert-butyl alcohol or dimethoxyethane.

3. The process as claimed in claim 1, wherein the liquid comprises a compound of the general formula (I)

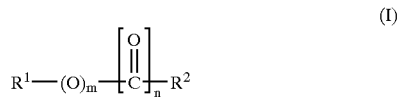

wherein:
  $R^1$ represents hydrogen, an aryl group, a substituted or unsubstituted C1–C10 alkyl group or a group $R^3$—NH—,
  $R^2$ represents hydrogen, an optionally halogenated C1–C10 alkyl group, a group $R^3$—NH—, a group —$R^4$—C(O)O—$R^5$ or a cyanide group,
  $R^3$ represents hydrogen or a C1–C10 alkyl group,
  $R^4$ represents a substituted or unsubstituted alkylene group having 2 to 15 carbon atoms,
  $R^5$ represents hydrogen, a substituted or unsubstituted C1–C10 alkyl group, and n and m independently are 0 or 1.

4. The process as claimed in claim 3, wherein in the general formula (I) $R^1$ represents hydrogen, m=1, n=0 and $R^2$ represents a group —$R^4$—OH with $R^4$ representing an alkylene group having 3 to 10 carbon atoms.

5. The process as claimed in claim 3, wherein in the general formula (I) $R^1$ and $R^2$ independently represent an alkyl group having 1 to 5 carbon atoms, m=1 and n=0.

6. The process as claimed in claim 5, wherein the compound of general formula (I) is selected from diethyl ether, methyl tert-butyl ether, di-isopropyl ether and dibutyl ether.

7. The process as claimed in claim 3, wherein in the general formula (I) $R^1$ represents an alkyl group having 1 to 6 carbon atoms, m=1, n=1 and $R^2$ represents hydrogen or an alkyl group having 1 to 6 carbon atoms or a group —$R^4$—C(O)O—$R^5$ with $R^4$ being a substituted or unsubstituted alkylene group having 3 to 15 carbon atoms and $R^5$ being an alkyl group having 1 to 5 carbon atoms.

8. The process as claimed in claim 7, wherein the compound of general formula (I) is selected from ethyl formiate, ethyl acetate, ethyl-2-ethyl-3-methyl butanoate, di-ethyl malonate and di-ethyl-2-cyclohexyl-2-propyl malonate.

9. The process as claimed in claim 3, wherein in the general formula (I) $R^1$ and $R^2$ independently represent an alkyl group having 1 to 5 carbon atoms, m=0 and n=0.

10. The process as claimed in claim 3, wherein in the general formula (I) $R^1$ represents an aryl group or an alkyl group having 1 to 5 carbon atoms, $R^2$ represents a cyanide group, m=0 and n=0.

11. The process as claimed in claim 3, wherein in the general formula (I) $R^1$ and $R^2$ independently represent a group $R^3$—NH— with $R^3$ being hydrogen or a C1–C10 alkyl group, m=0 and n=1.

12. The process as claimed in claim 3, wherein in the general formula (I) $R^1$ represents hydrogen, $R^2$ represents a halogen-substituted C1–C5 alkyl group, m=0 and n=0.

13. The process as claimed in claim 1, wherein step (d) comprises the steps of
    (d1) admixing organic complexing agent and water with the layer containing the DMC catalyst and allowing a two phase system to be formed consisting of a second aqueous layer and a layer containing the DMC catalyst;

(d2) removing the second aqueous layer;

(d3) optionally repeating steps (d1) and (d2) one to five times;

(d4) adding organic complexing agent to layer containing the DMC catalyst while stirring; and (d5) removing the complexing agent and recovering the DMC catalyst as solid particles.

14. The process as claimed in claim 1, wherein step (d) comprises the steps of:

(d1) admixing organic complexing agent and water with the layer containing the DMC catalyst and allowing a two phase system to be formed consisting of a second aqueous layer and a layer containing the DMC catalyst;

(d2) removing the second aqueous layer;

(d3) optionally repeating steps (d1) and (d2) one to five times;

(d4) adding organic complexing agent to layer containing the DMC catalyst while stirring;

(d5) adding a liquid polyol to the product of step (d4), thereby forming a slurry of DMC catalyst in a liquid medium of polyol/organic complexing agent;

(d6) removing the organic complexing agent; and (d7) recovering the DMC catalyst as a suspension in the liquid polyol.

15. A catalyst obtainable by a process comprising the steps of:

(a) combining an aqueous solution of a metal salt with an aqueous solution of a metal cyanide salt and reacting these solutions, wherein at least part of this reaction takes place in the presence of an organic complexing agent, thereby forming a dispersion of a solid DMC complex in an aqueous medium;

(b) combining the dispersion obtained in step (a) with a liquid, which is essentially insoluble in water and which is capable of extracting the solid DMC complex formed in step (a) from the aqueous medium, and allowing a two-phase system to be formed consisting of a first aqueous layer and a layer containing the DMC complex and the liquid added;

(c) removing the first aqueous layer; and (d) recovering the DMC catalyst from the layer containing the DMC catalyst.

16. A process for the polymerization of alkylene oxides, which process comprises polymerizing an alkylene oxide in the presence an a hydroxyl group-containing initiator and a DMC catalyst obtained by a process comprising the steps of:

(a) combining an aqueous solution of a metal salt with an aqueous solution of a metal cyanide salt and reacting these solutions, wherein at least part of this reaction takes place in the presence of an organic complexing agent, thereby forming a dispersion of a solid DMC complex in an aqueous medium;

(b) combining the dispersion obtained in step (a) with a liquid, which is essentially insoluble in water and which is capable of extracting the solid DMC complex formed in step (a) from the aqueous medium, and allowing a two-phase system to be formed consisting of a first aqueous layer and a layer containing the DMC complex and the liquid added;

(c) removing the first aqueous layer; and (d) recovering the DMC catalyst from the layer containing the DMC catalyst.

* * * * *